(No Model.)
D. O. PAIGE.
ANGLE IRON.
No. 319,305. Patented June 2, 1885.
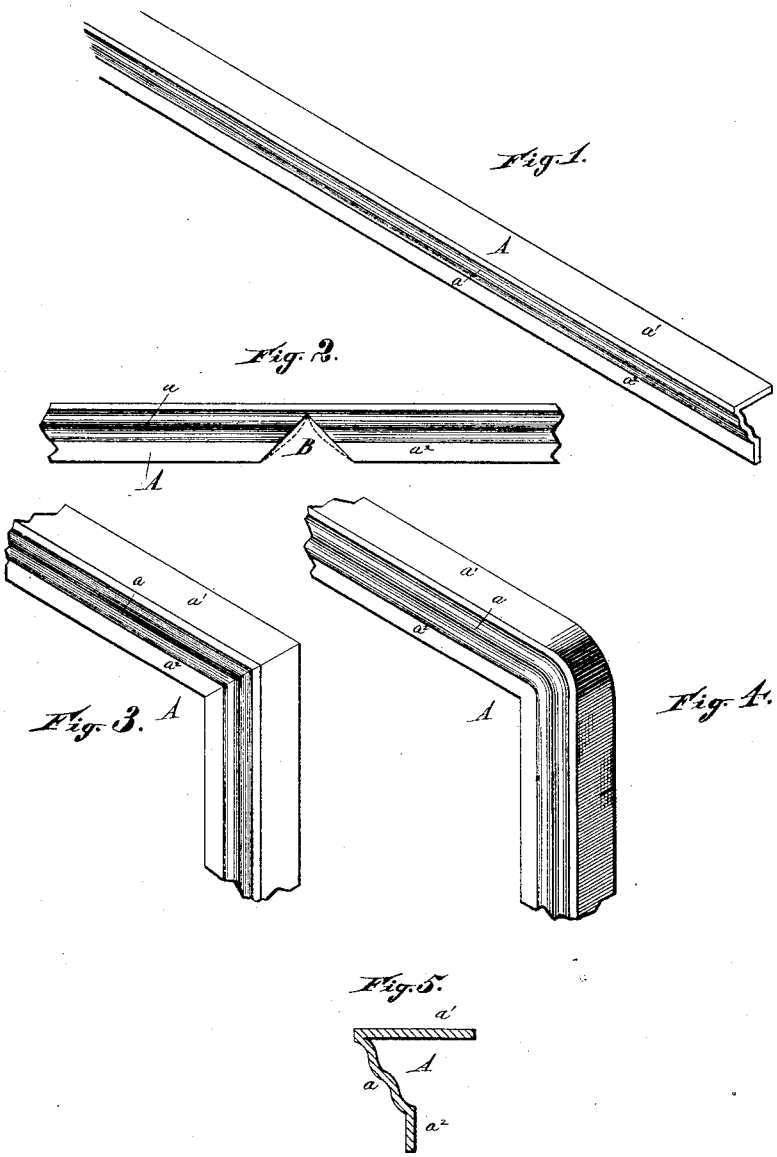
WITNESSES
Jno. E. Wiles.
N. S. Wright.
INVENTOR
David O. Paige,
By W. W. Leggett,
Attorney

UNITED STATES PATENT OFFICE.

DAVID O. PAIGE, OF DETROIT, MICHIGAN.

ANGLE-IRON.

SPECIFICATION forming part of Letters Patent No. 319,305, dated June 2, 1885.

Application filed August 18, 1884. (No model.)

*To all whom it may concern:*

Be it known that I, DAVID O. PAIGE, of Detroit, county of Wayne, State of Michigan, have invented a new and useful Improvement in Angle-Irons; and I declare the following to be a full, clear, and exact description of the same, such as will enable others skilled in the art to which it pertains to make and use it, reference being had to the accompanying drawings, which form a part of this specification.

My invention relates to the device hereinafter specified, and more particularly pointed out in the claims; and it consists, essentially, in the construction of solid angle-irons which shall be provided with an ornamental strengthening-molding integral therewith, such molding being especially adapted for use in the manufacture of safes, although I do not confine myself to its use in connection therewith.

In the drawings, Figure 1 is a perspective view of the angle-iron. Fig. 2 is an elevation of the same notched, ready for bending. Fig. 3 is a view of same bent to form a square corner. Fig. 4 is a view of the same bent with a rounded corner. Fig. 5 is a cross-section.

As illustrated in the drawings, A represents an angle-iron; $a$, the molding formed integral therewith in the process of manufacture. This molding may be of any desired pattern, and may be formed on one or both of the flanges $a'$ and $a^2$, of which the angle-iron is composed. These flanges may have any desired angle to each other.

These angle-irons embodying my invention are preferably rolled, any desired form of roll being employed for this purpose.

I am not aware that angle-irons have ever heretofore been constructed with the molding integral therewith.

In the application of this angle-iron upon safes or other articles it may be bent, if desired, so as to form square or rounded corners. To do this it will be necessary first to cut a notch of suitable shape, as shown in Fig. 2, at B, in which figure the dotted lines show a suitable notch for a rounded corner.

In bending said angle-iron I prefer to cut the edges adjacent to said notch upon a suitable bevel, so that when brought together said edges will lap a little by each other, after which they may be heated and welded together, thus making a strong corner. I do not limit myself to any particular method of turning the corners in case the angle-iron is to be bent, as it may be bent in any proper way. In case the edges adjacent to the notch are welded together, this may be readily accomplished by means of a drop-hammer. Any other method, however, may be employed for this purpose.

It is the purpose of my invention to manufacture angle-irons of this description in the bar, ready to be worked up into various shapes and for various uses, as occasion may require. Not only does this make an ornamental angle-iron, but also an angle-iron stronger yet at the same time cheaper than such irons have heretofore been constructed.

What I claim is—

1. As an article of manufacture, an angle-iron having a rolled molding formed integral therewith, substantially as described.

2. As an article of manufacture, an angle-iron having a rolled molding formed integral therewith upon one face and a plain surface upon the other face, substantially as described.

In testimony whereof I sign this specification in the presence of two witnesses.

DAVID O. PAIGE.

Witnesses:
N. S. WRIGHT,
M. B. O'DOGHERTY.